United States Patent
Finn et al.

(12)

(10) Patent No.: US 6,607,358 B2
(45) Date of Patent: Aug. 19, 2003

(54) MULTI-COMPONENT HYBRID TURBINE BLADE

(75) Inventors: Scott Roger Finn, Niskayuna, NY (US); Jan Christopher Schilling, Middletown, OH (US); Wendy Wen-Ling Lin, Niskayuna, NY (US); Mustafa Dindar, Clifton Park, NY (US); Robert Paul Tyler, Harrison, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/040,238

(22) Filed: Jan. 8, 2002

(65) Prior Publication Data

US 2003/0129061 A1 Jul. 10, 2003

(51) Int. Cl.[7] .................................................. F01D 5/14
(52) U.S. Cl. .................. 416/224; 416/230; 416/229 A; 416/241 A
(58) Field of Search ............................. 416/229 R, 230, 416/229 A, 241 R, 241 A, 224

(56) References Cited

U.S. PATENT DOCUMENTS

| 3,762,835 A | * | 10/1973 | Carlson et al. ............. 416/224 |
| 5,018,271 A | * | 5/1991 | Bailey et al. ............. 29/889.71 |
| 5,375,978 A | | 12/1994 | Evans et al. |
| 5,403,153 A | * | 4/1995 | Goetze ................... 416/229 A |
| 5,449,273 A | * | 9/1995 | Hertel et al. ................. 416/224 |
| 5,486,096 A | * | 1/1996 | Hertel et al. ................. 416/224 |
| 5,605,441 A | * | 2/1997 | Boszor et al. .............. 415/200 |
| 5,655,883 A | | 8/1997 | Schilling |
| 5,720,597 A | * | 2/1998 | Wang et al. ............ 416/229 A |
| 5,791,879 A | | 8/1998 | Fitzgerald et al. |
| 5,908,528 A | * | 6/1999 | Walla et al. ............. 156/307.1 |

* cited by examiner

Primary Examiner—Ninh H. Nguyen
(74) Attorney, Agent, or Firm—Penny A. Clarke; Patrick K. Patnode (57) ABSTRACT

A multi-component hybrid turbine blade comprises a shank portion and an airfoil portion. The airfoil portion comprises a composite section having a first density. The composite section comprises a recess and an insert section. The insert section has a second mass density, which is less than the first mass density. The insert section is disposed in the recess, and the insert section is bonded to the composite section. The composite section and the insert section together define an airfoil shape. A fabrication method comprising laying up composite material layers to form a portion of the composite section. The portion of the composite section comprises a recess. Disposing the insert section in the recess. Laying up additional composite material layers to achieve a final desired thickness of the composite section while covering the insert section.

50 Claims, 7 Drawing Sheets

MULTI-COMPONENT HYBRID TURBINE BLADE

BACKGROUND

The present invention relates generally to both gas turbines and steam turbines, and more particularly to a turbine blade composed of several components made from different materials.

Steam turbines include, but are not limited, to steam turbine power generation equipment and shipboard steam turbine propulsion equipment. Gas turbines include, but are not limited to, gas turbine power generation equipment and gas turbine aircraft engines. An exemplary steam turbine typically contains a high-pressure turbine section, a low-pressure turbine section, or a combination of both, which is rotated by the steam flow. An exemplary gas turbine typically includes a core engine, having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) connected by a smaller diameter coaxial shaft to drive the front fan (located forward of the high pressure compressor) and to drive an optional low pressure compressor (located between the front fan and the high pressure compressor). The low-pressure compressor sometimes is called a booster compressor or simply a booster.

In the exemplary gas turbine, typically the fan and the high and low pressure compressors and turbines have gas turbine blades each including an airfoil portion attached to a shank portion. In the exemplary steam turbine, typically the high and low pressure turbine sections have steam turbine blades each including an airfoil portion attached to a shank portion. Rotor blades are gas or steam turbine blades attached to a rotating gas or steam turbine rotor discs, respectively. Stator vanes are gas turbine blades or steam turbine blades attached to a non-rotating gas or steam turbine stator casings, respectively. Typically, there are alternating circumferential rows of radially-outwardly extending rotor blades and radially-inwardly extending stator vanes. When present in the gas turbine configuration, a first and/or last row of stator vanes (also called inlet and outlet guide vanes) may have their radially-inward ends also attached to a non-rotating gas turbine stator casing. Counter rotating "stator" vanes are also known in gas turbine designs. Conventional gas and steam turbine blade designs typically have airfoil portions that are made entirely of metal, such as titanium, or are made entirely of a composite. The all-metal blades, including costly wide-chord hollow blades, are heavier in weight, resulting in lower fuel performance and requiring sturdier blade attachments.

In a gas turbine aircraft application, the lighter all-composite blades, without a metal leading edge, are more susceptible to damage from bird ingestion events. Known hybrid blades include a composite blade whose leading edge is protected by metal (with the rest of the blade covered by a non-metallic coating) for erosion and bird impact reasons. The gas turbine fan blades typically are the largest (and therefore the heaviest) blades in a gas turbine aircraft engine and the front fan blades are the first to be impacted by a bird strike. Composite blades have typically been used in applications where weight is a major concern. However, the desire for reduced collateral damage during blade loss events in addition to higher operating speeds has created the desire to reduce the weight of these blades even further.

Accordingly, there is a need for an improved turbine blade specifically, what is needed is a gas turbine blade, and especially a gas turbine fan blade, that is lighter in weight than either traditional composite or hybrid blades. What is also needed is a steam turbine blade that is lighter than either traditional composite or hybrid blades.

SUMMARY

The present invention, in one embodiment, provides a multi-component hybrid turbine blade comprising a shank portion and an airfoil portion. The airfoil portion comprises a composite section having a first density. The composite section comprises a recess and an insert section. The insert section has a second mass density, which is less than the first mass density. The insert section is disposed in the recess, and the insert section is bonded to the composite section. The composite section and the insert section together define an airfoil shape.

A fabrication method is provided, in another embodiment, comprising prefabricating the insert section, and laying up composite material layers to form a portion of the composite section, where the portion of the composite section comprises a recess followed by disposing the insert section in the recess and laying up additional composite material layers to achieve a final desired thickness of the composite section while covering the insert section.

DRAWINGS

These and other features, aspects, and advantages of the present invention will become better understood when the following detailed description is read with reference to the accompanying drawings in which like characters represent like parts throughout the drawings, wherein.

DESCRIPTION

The multi-component hybrid turbine blade 10, in accordance with one embodiment of the present invention, includes a shank portion 12 and an airfoil portion 14 as depicted in FIGS. 1–6. The airfoil portion 14 has a design operating temperature, a blade root 16 attached to the shank portion 12, a blade tip 18, and a radial axis 20 extending outward toward the blade tip 18 and inward toward the blade root 16. As used herein, "radial axis" 20 refers to reference axis and not a physical part of hybrid turbine blade 10. In a gas turbine application the design operating temperature is the maximum temperature the airfoil portion 14 is expected to experience during normal operation of the gas turbine (not shown). An example of a typical gas turbine and a typical steam turbine design operating temperature is, without limitation, between generally 18 degrees Centigrade and generally several-hundred degrees Centigrade. Medium direction arrows 26 in FIG. 1 generally indicate the medium direction. The medium typically comprises air in a gas turbine application and typically comprises saturated steam or superheated steam in a steam turbine application.

Figure 2:
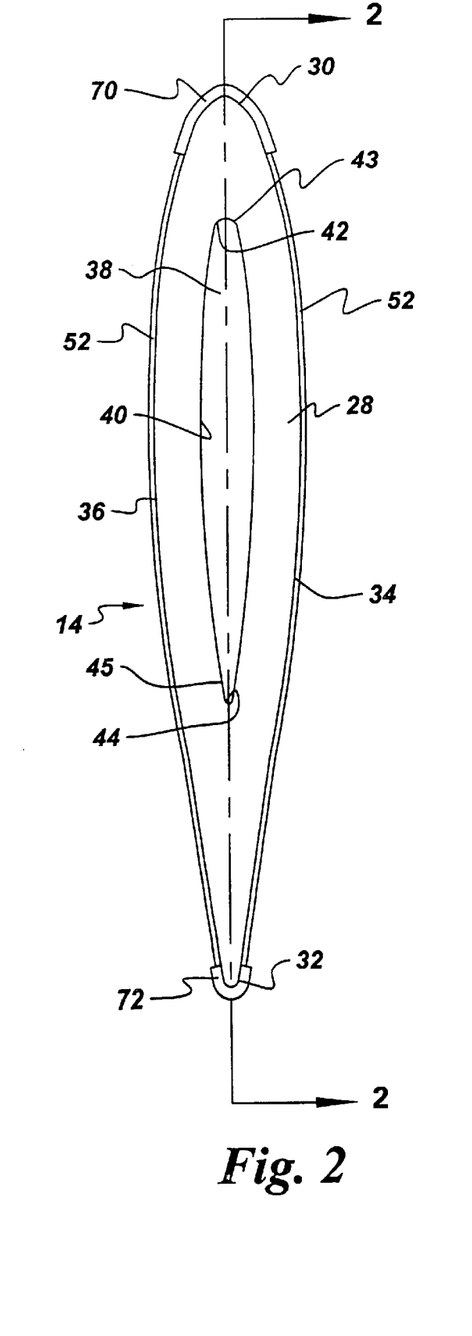
FIG. 2 is a schematic cross-sectional view of the airfoil portion of an embodiment of the hybrid turbine blade of FIG. 1, taken along lines 2—2 of FIG. 1.

In a gas turbine application of the hybrid turbine blade 10, the shank portion 12 typically includes a dovetail 22, for attachment of the hybrid turbine blade 10 to a rotor disc (not shown), and a blade platform 24, for helping to radially contain the air flow. The airfoil portion 14 has a leading edge 30 and a trailing edge 32, wherein the medium direction 26 is generally from the leading edge 30 to the trailing edge 32. The airfoil portion 14 also has a pressure side 34 and a suction side 36 as depicted in FIG. 2, where the distance from a leading edge 30 to the trailing edge 32 across the suction side 36 is typically longer than the distance from the leading edge 30 to the trailing edge 32 across the pressure side 34. In a gas turbine compressor application the hybrid turbine blade 10 typically rotates in a direction such that the pressure side 34 passes a reference point before the suction side 36 passes the same reference point. In a steam turbine application the hybrid turbine blade 10 typically rotates in a direction such that the suction side 36 passes a reference point before the pressure side 34 passes the same reference point.

Figure 3:
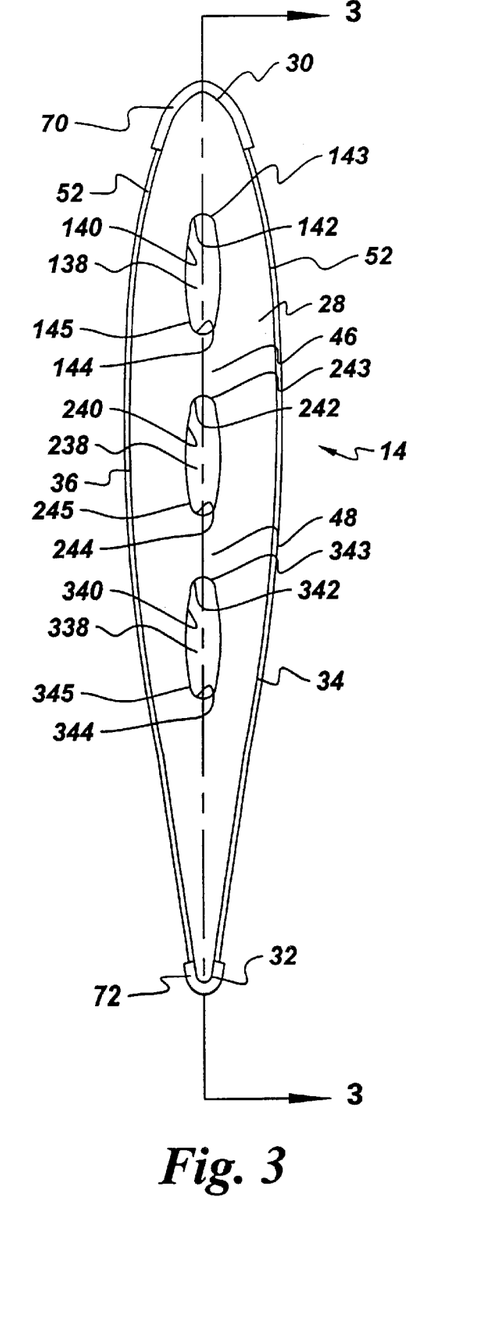
FIG. 3 is a schematic cross-sectional view of the airfoil portion of an embodiment of the hybrid turbine blade of FIG. 4, taken along lines 3—3 of FIG. 4.

The airfoil portion 14 also includes a composite section 28 as depicted in FIGS. 2 and 3. As used herein, "composite section" is defined as a section comprising a composite material. The term "composite material" is defined to be a material having any (metal or non-metal) fiber filament embedded in any (metal or non-metal) matrix binder. In one embodiment of the present invention, the composite section 28 is a lay-up of discrete composite laminations. The composite material is comprised of fiber filaments embedded in a matrix binder. In an exemplary embodiment, the composite material is comprised of graphite fiber filaments embedded in an epoxy (i.e. epoxy resin) matrix binder. Other choices for the fiber filaments in the composite material include, but are not limited to, glass fibers, aramid fibers, carbon fibers, and boron fibers and combinations thereof. Other choices for the matrix resin include, but are not limited to, bismaleimide, polyimide, polyetherimide, polyetheretherketone, poly(aryl sulfone), polyethersulfone and cyante ester and combinations thereof. In one embodiment the matrix binder includes toughening materials such as rubber particles. The composite section 28 has a first mass density and radially extends from generally the blade root 16 to generally the blade tip 18. The first mass density of the composite section 28 typically is in a range from about 1.4 grams per cubic centimeter to about 2.0 grams per cubic centimeter. The composite section 28 extends spanwise along the entire leading edge 30 and the entire trailing edge 32 between a blade platform 24 and a blade tip 18. The composite section 28 extends chordwise between the leading and trailing edges 30 and 32. In an exemplary construction, the composite section 28 has no surface through-holes and no recesses other than those containing an (meaning at least one) insert section 38, and no internal voids. The composite section 28 has a (meaning at least one) recess 40 and the recess 40 comprises an interior leading edge 42, an interior trailing edge 44, an interior blade tip edge 60 and an interior blade root edge 62.

The airfoil portion 14 additionally includes an (meaning at least one) insert section 38 (seen in FIGS. 1–6). In a gas turbine application, the insert section 38 is located in the hybrid turbine blade 10 such that neither the bird strike resistance nor the frequency response of the hybrid turbine blade 10 is sacrificed. The insert section 38 is incorporated into the standard lay-up and curing process of the hybrid turbine blade 10 and requires no special tooling apart from that required to fabricate the insert section 38 itself. In one embodiment of the present invention, the insert section 38 comprises a first insert section 138 and a second insert section 238 that are not in physical contact with each other. In one embodiment of the present invention, "insert section" 38 has a second mass density that is lower than the first mass density of the composite section 28. In one embodiment of the present invention, the insert section 38 is comprised of an elastomeric material. In one alternative embodiment, the insert section 38 is comprised of a base thermoplastic elastomer and lightweight filler particles. The lightweight filler particles are generally identically sized, wherein the lightweight filler particles comprise a plurality of air-containing cavities. Each cavity in each lightweight filler particle typically has a volume of about $10^{-16}$ cubic-millimeters. As used herein, the term "lightweight" is defined to be material having a density in a typical range from about 0.001 grams/cm$^3$ to about 1.2 grams/cm$^3$. In one embodiment of the present invention, the lightweight filler particles are comprised of polymer particles, where each polymer particle typically comprises the air containing cavity and each polymer particle has a cellular structure (regardless of size, shape, uniformity, or content). These lightweight filler particles are generally uniformly dispersed throughout the base elastomer in the insert section 38. In one embodiment, the lightweight elastomer material in the insert section 38 is fabricated by introducing lightweight filler particles into the base elastomer prior to curing. The resulting density of the elastomer material in the insert section 38 is lower than that of the fiber-reinforced composite section 28.

Figure 6:
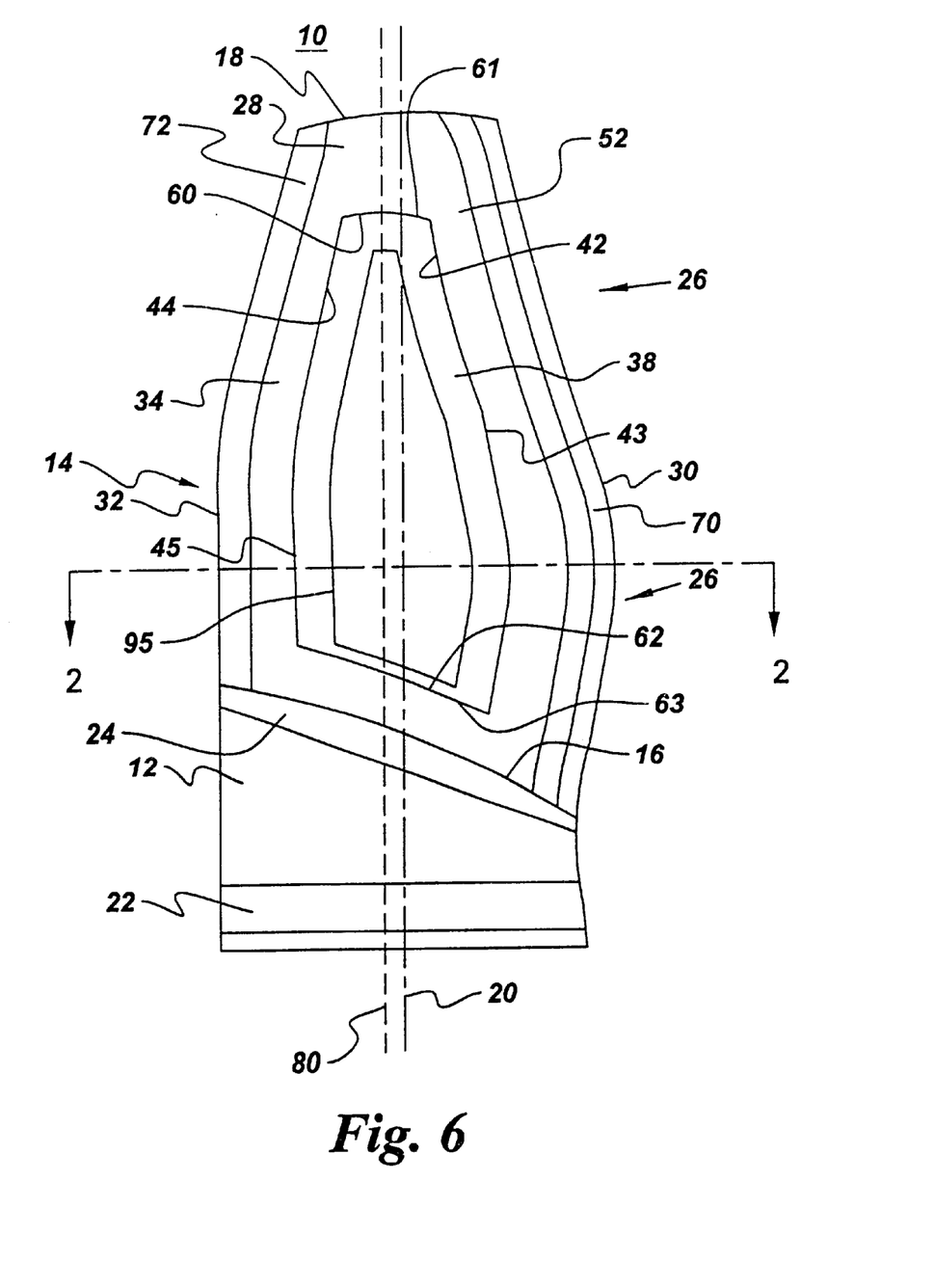
FIG. 6 is a schematic side-elevational view of the pressure side of an alternative embodiment of the turbine blade of the present invention.

In another embodiment of the present invention, the insert section 38 comprises a hollow portion 95 as shown in FIG. 6. The insert section 38 is typically made from a thermoplastic material or alternatively a thermoset material. Other material choices from which to construct the insert section 38 comprising the hollow portion 95 include, but are not limited to, thermoplastic materials and thermoset materials, metals, honeycomb ceramics, or silicones, and combinations thereof. In some embodiments of the present invention, the insert section 38 comprising the hollow portion 95 is made by an injection molding process to produce an injection-molded version of the insert section 38. In some embodiments of the present invention the insert section 38 comprising the hollow portion 95 further comprises internal ribs to enhance the overall crush stiffness and strength of the insert section 38. The artisan selects the number and orientation of the internal ribs in the insert section 38.

In another embodiment of the present invention the insert section 38 is fabricated with the hollow portion 95, where the insert section 38 further comprises a port (not shown) and an internal tube (not shown). The internal tube is coupled from the port to the hollow portion 95 that allows fluid to be either added, pressurized or removed from the hollow portion 95 of the insert section 38. In the embodiment where the insert section 38 comprises the hollow portion 95 and the hollow portion 95 of the insert section 38 can be filled and pressurized, the insert section material typically utilized is a flexible membrane material. In one alternative embodiment, the flexible membrane material has internal reinforcements, while in another embodiment of the present invention the flexible membrane material has external reinforcements. The number and orientation of the internal ribs or external ribs in the insert section 38 is left to the artisan. During one fabrication embodiment of the multi-component hybrid turbine blade 10 that utilizes the insert section 38 comprising the hollow portion 95, port and internal tube, the composite section 28 further comprises a fluid path coupled to the port of the insert section 38 on one end and coupled to an outer surface of the composite section 28 on the other. In this embodiment, after a portion of the composite layers is laid up, the insert section 38 is placed in the recess 40. The hollow portion 95 of the insert section 38 is filled with fluid and pressurized so that the insert section 38 achieves the desired shape. Additional composite layers are disposed, covering the insert section 38, to produce a completed version of the composite section 28, while maintaining the fluid drain path. In another embodiment, the hollow portion 95 of the insert section 38 is filled with fluid and pressurized, so that the insert section 38 achieves the desired shape, after the additional composite layers are disposed to cover the insert section 38 to produce the completed version of the composite section 28. Typically, the fluid is drained from the hollow portion 95 of the insert section 38 through the drain path after the completed version of the composite section 28 is bonded and consolidated.

In one embodiment of the present invention, the resulting second mass density of the insert section 38 produced by the present invention is generally in a typical range from about 0.01 grams per cubic centimeter to about 0.9 grams per cubic centimeter. In another embodiment of the present, the density of the insert section 38 comprising the hollow portion 95 that has been drained of fluid after fabrication of the hybrid turbine blade 10 is complete, is generally in a typical range from about 0.01 grams per cubic centimeter to about 0.9 grams per cubic centimeter. The second mass density of the insert section 38 is lower than the first mass density of the composite section 28. The insert section 38 further comprises an insert leading edge 43, an insert trailing edge 45, an insert blade tip edge 61, and an insert blade root edge 63.

The high elongation capability and low elastic modulus of the elastomer material in the insert section 38 allows mechanical loads to be efficiently transferred around the insert section 38 rather than through the insert section 38. In one embodiment, the elastomer material in the insert section 38 has an elongation capability of at least about 20% and has an elastic modulus range from about 3500 kPa to about 350000 kPa. The elastic modulus and elongation capability of the insert section material is selected, such that the insert section material has a low deformation during the processing of the insert section 38 and the strength to withstand cracking during fabrication. In addition the insert section material is selected, such that the insert section material is capable of withstanding low cycle and high cycle fatigue. Low cycle fatigue is typically represented by about 30,000 startup and shutdown cycles, while the high cycle fatigue is typically represented by greater than 1,000,000 rotational cycles.

In one embodiment of the present invention, the insert section 38 is formed such that it has sufficient stiffness and dimensional stability to maintain the airfoil shape during fabrication of the composite section 28. In one embodiment of the present invention, the insert section 38 is formed so as to retain sufficient compliance and flexibility, so that the insert section 38 to conforms to the recess 40. The artisan chooses the number and location of the insert sections 38.

The insert section 38 is bonded to the composite section 28. The bonding is accomplished by adhesion between the insert section material and the composite section material. Other examples of bonding include, without limitation, autoclave cycle curing, adhesive bonding, and fusion bonding (adhesive film or paste). The insert section 38 has a second volume, and in an alternative embodiment, the second volume is equal to at least generally ten percent of a first volume of the composite section 28. The composite section 28 and the insert section 38 (which in one embodiment comprises two or more insert sections, as shown in FIGS. 3, 4 and 5, by a first insert section 138, a second insert section 238, and a third insert section 338) together typically define an airfoil shape.

Figure 1:
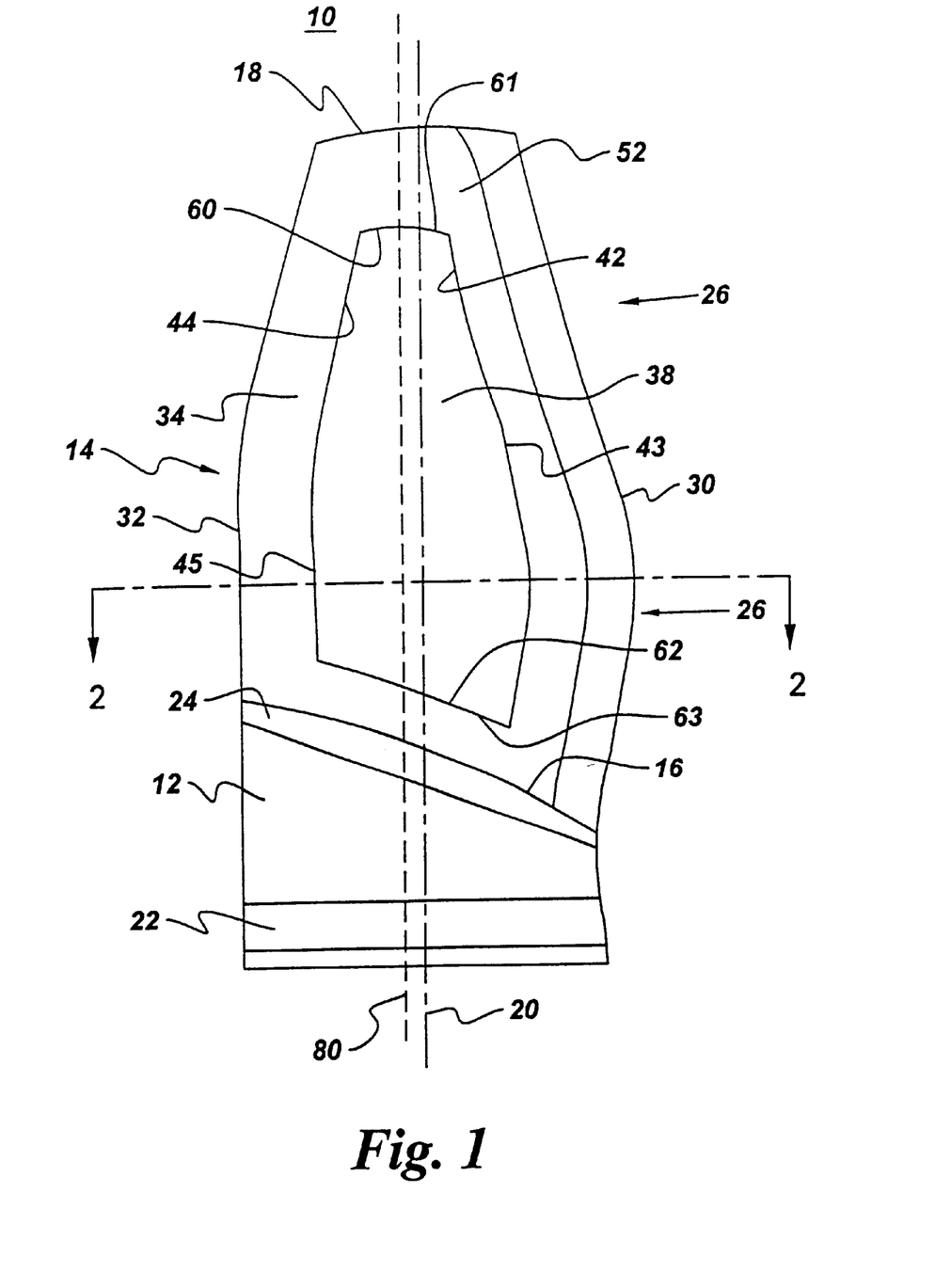
FIG. 1 is a schematic side-elevational view of the pressure side of a one embodiment of the hybrid turbine blade of the present invention.

The composite section 28 comprises a recess 40 as depicted in FIGS. 1 and 2 of one embodiment of the present invention, where a major axis 80 of the recess 40 is parallel to the radial axis 20. The recess 40 has an interior leading edge 42, an interior trailing edge 44, an interior blade tip edge 60, and an interior blade root edge 62. The insert section 38 is disposed in the recess 40 so that the insert leading edge 43 is disposed on the interior leading edge 42, the insert trailing edge 45 is disposed on the interior trailing edge 44, the insert blade tip edge 61 is disposed on the interior blade tip edge 60 and the insert blade root edge 63 is disposed on the interior blade root edge 62.

Figure 4:
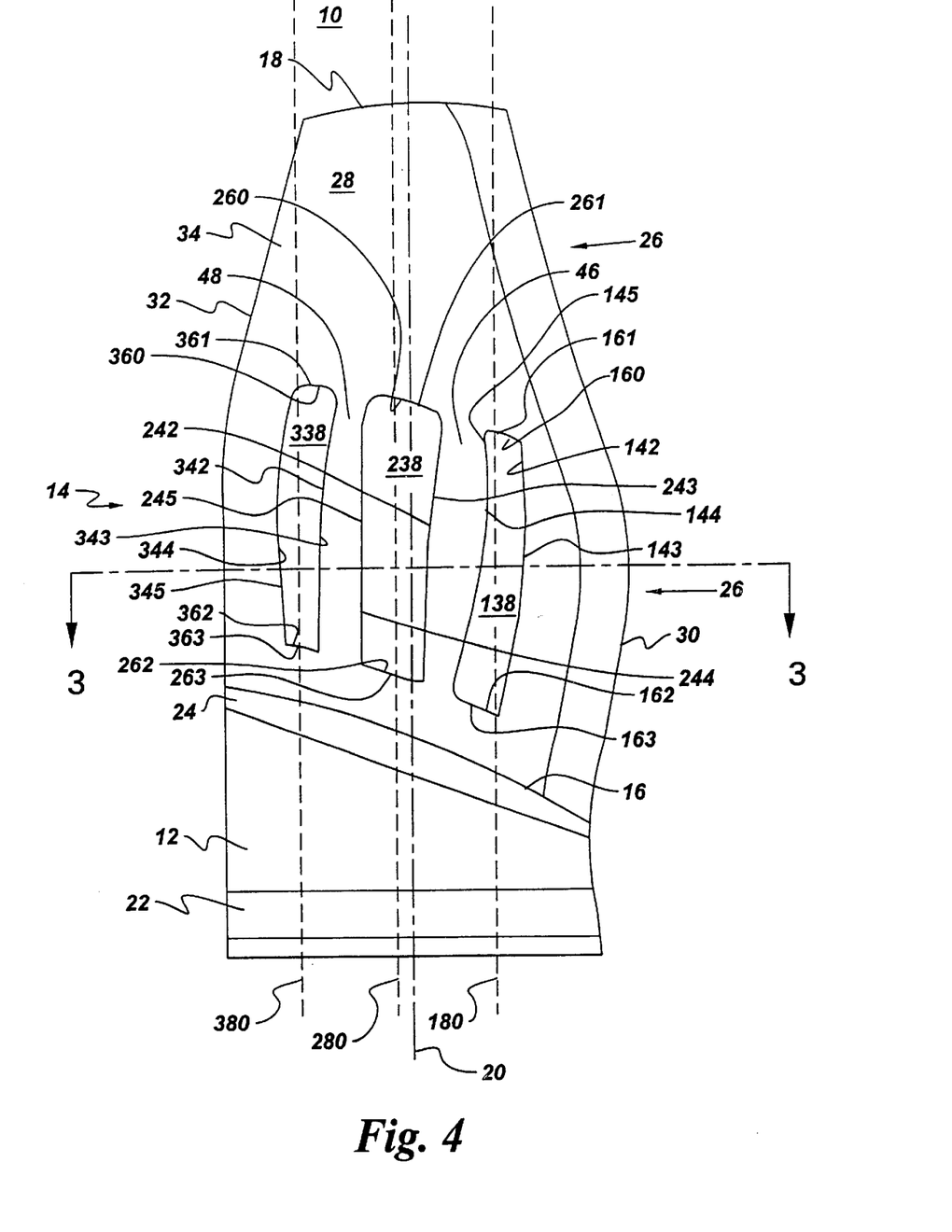
FIG. 4 is a schematic side-elevational view of the pressure side of another embodiment of the turbine blade of the present invention.
Figure 5:
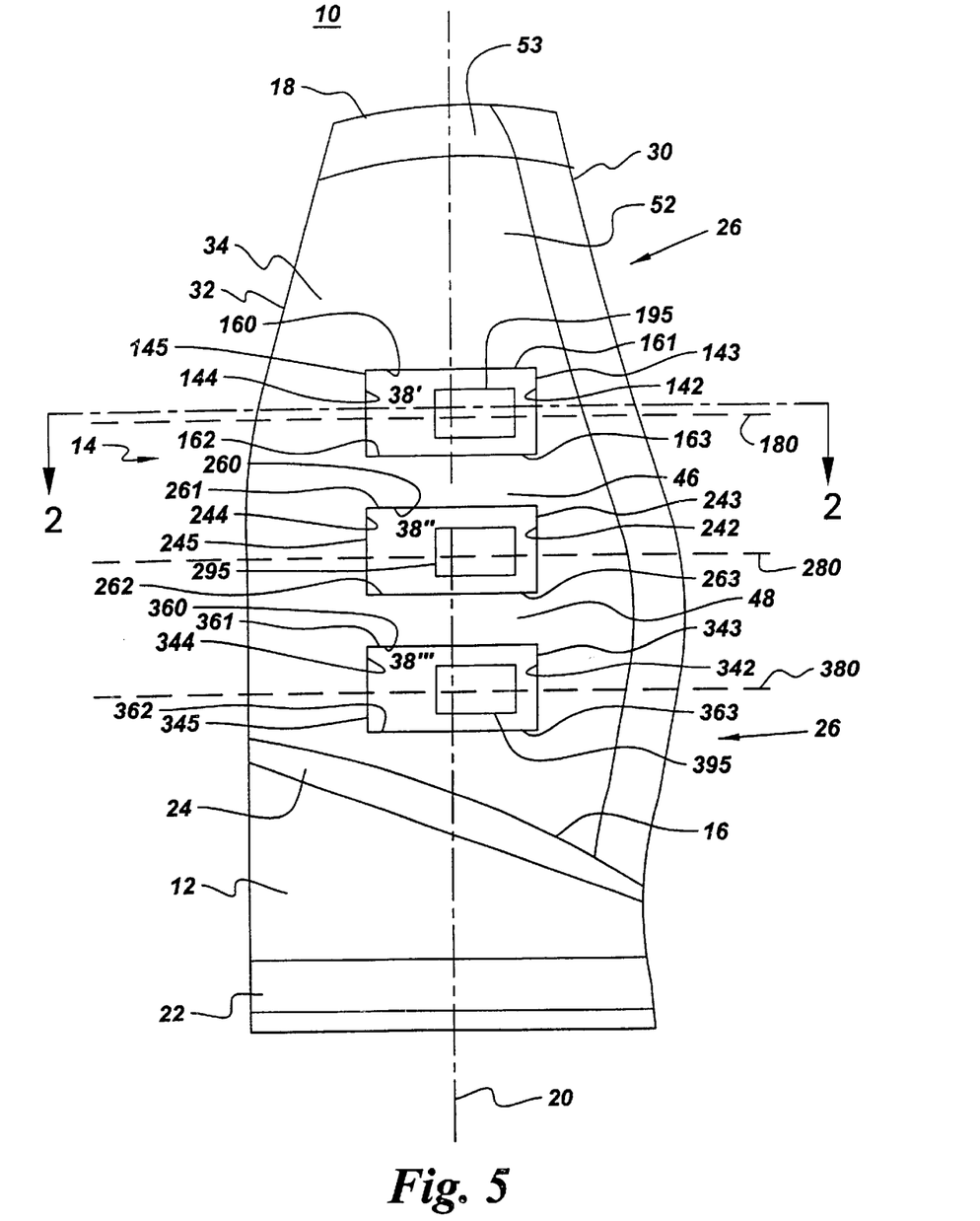
FIG. 5 is a schematic side-elevational view of the pressure side of another embodiment of the turbine blade of the present invention.

In an exemplary embodiment, the composite section 28 as depicted in FIGS. 3 and 4 includes a first recess 140, a second recess 240 and a third recess 340. A first recess major axis 180, a second recess major axis 280 and a third recess major axis 380 of the recesses 140, 240 and 340, respectively are parallel to the radial axis 20. The major axis's 180, 280 and 380 of recess 140, 240 and 340, respectively are oriented from typically the blade platform 24 towards the blade tip 18 along the span of the air foil portion 14. In one embodiment of the present invention insert sections 138, 238 and 338 are utilized and are located in each of the corresponding first, second and third recesses 140, 240 and 340, respectively. The first, second and third recesses 140, 240 and 340 have a first interior leading edge 142, a second interior leading edge 242, and a third interior leading edge 342, respectively; a first interior trailing edge 144, a second interior trailing edge 244 and a third interior trailing edge 344, respectively; a first interior blade tip edge 160, a second interior blade tip edge 260, and a third interior blade tip edge 360, respectively, and a first interior blade root edge 162, a second interior blade root edge 262, and a third interior blade root edge 362, respectively. The first insert section 138, second insert section 238 and third insert section 338 have a first insert leading edge 143, a second insert leading edge 243 and a third leading edge 343, respectively, a first insert trailing edge 145, a second insert trailing edge 245 and a third trailing edge 345, respectively, a first insert blade tip edge 161, a second blade tip edge 261 and a third blade tip edge 361, respectively and a first insert blade root edge 163, a second blade root edge 263 and a third blade root edge 363, respectively. The insert sections 138, 238 and 338 are disposed on the recesses 140, 240, and 340, respectively so that the first insert leading edge 143, second insert leading edge 243 and third insert leading edge 343 are disposed on the first interior leading edge 142, second interior leading edge 242, and third interior leading edge 342, respectively; the first insert trailing edge 145, second insert trailing edge 245, and third insert trailing edge 345 are disposed on the first interior trailing edge 144, second interior trailing edge 244 and third interior trailing edge 344, respectively, the first insert blade tip edge 161, second insert blade tip edge 261 and third insert blade tip edge 361 are disposed on the first interior blade tip edge 160, second interior blade tip edge 260 and third interior blade tip edge 360, respectively and the first insert blade root edge 163, second insert blade root edge 263 and third insert blade root edge 363 are disposed on the first interior blade root edge 162, second interior blade root edge 262 and third interior blade root edge 362, respectively.

In one embodiment of the present invention, when the first insert section 138 and the second insert section 238 (in other words, at least two insert sections) are utilized, the composite section 28 includes a rib 46, typically comprised of the same composite material as the composite section 28. The rib 46 is disposed between, and bonded to, the first and second insert sections 138 and 238. The rib 46 extends between the first interior trailing edge 144 and the second interior leading edge 242 as depicted in FIG. 4. A desired location for the first insert section 138 and second insert section 238 is closer to the blade root 16 than the blade tip 18. When the third insert section 338 is utilized an additional rib (such as additional rib 48 as depicted in FIGS. 3 and 4) is employed to extend between the second interior trailing edge 244 and the third interior leading edge 342 in the airfoil portion 14. Alternative embodiments of the present invention utilize additional numbers of insert sections and additional ribs to preserve the strength of the hybrid turbine blade 10. Additional ribs provide for improved stiffness and act to limit crack growth and delamination. Additional ribs are also typically comprised of the same composite material as the composite section 28 and the rib 46. The orientation of the ribs is left to the artisan. In another embodiment of the present invention, the first insert section 138 comprises a first insert hollow portion 195 and the second insert section 238 comprises a second insert hollow portion 295. In another embodiment of the present invention, the first insert section 138 comprises the first insert hollow portion 195, the second insert section 238 comprises the second insert hollow portion 295 and the third insert section 338 comprises a third insert section 338. The structure for the first insert section 138 comprising the first insert hollow portion 195, the second insert section 238 comprising the second insert hollow portion 295 and the third insert section 338 comprising the third insert section 338 is similar to that described above for the insert section 38 that comprises the hollow portion 95.

In an alternative embodiment, the composite section 28 as depicted in FIG. 5 includes the first recess 140, second recess 240 and third recess 340. The first recess major axis 180, second recess major axis 280 and third recess major axis 380 of each recess 140, 240 and 340, respectively is perpendicular to the radial axis 20 (i.e. the major axis 180, 280 and 380 of recess 140, 240 and 340, respectively is oriented from the leading edge 30 towards the trailing edge 32 along the chord of the air foil portion 14). The first recess 140, second recess 240 and third recess 340 are similar to those elements described above for FIGS. 3 and 4. The orientations of the first insert section 138, the second insert section 238, and the third insert section 338 are similar to those elements described above for FIGS. 3 and 4. When more than one insert section 38 of FIG. 5 is utilized, the composite section 28 typically includes a rib 46, of the same composite material as the composite section 28. The rib 46 is disposed between, and bonded to, the first insert section 138 and second insert section 238, where the rib 46 extends between a first interior blade root edge 162 and a second interior blade tip edge 260. In an alternative embodiment of the present invention that utilizes the third insert section 338 an additional rib (such as additional rib 48 may be employed to extend between the second interior blade root edge 262 and the third interior blade tip edge 360 in the airfoil portion 14. As discussed above, alternative embodiments of the present invention utilize additional numbers of insert sections and additional ribs to preserve the strength of the hybrid turbine blade 10. The additional ribs are utilized to improve stiffness and to act as crack/delamination stoppers. The orientation of the ribs is left to the artisan.

Figure 7:
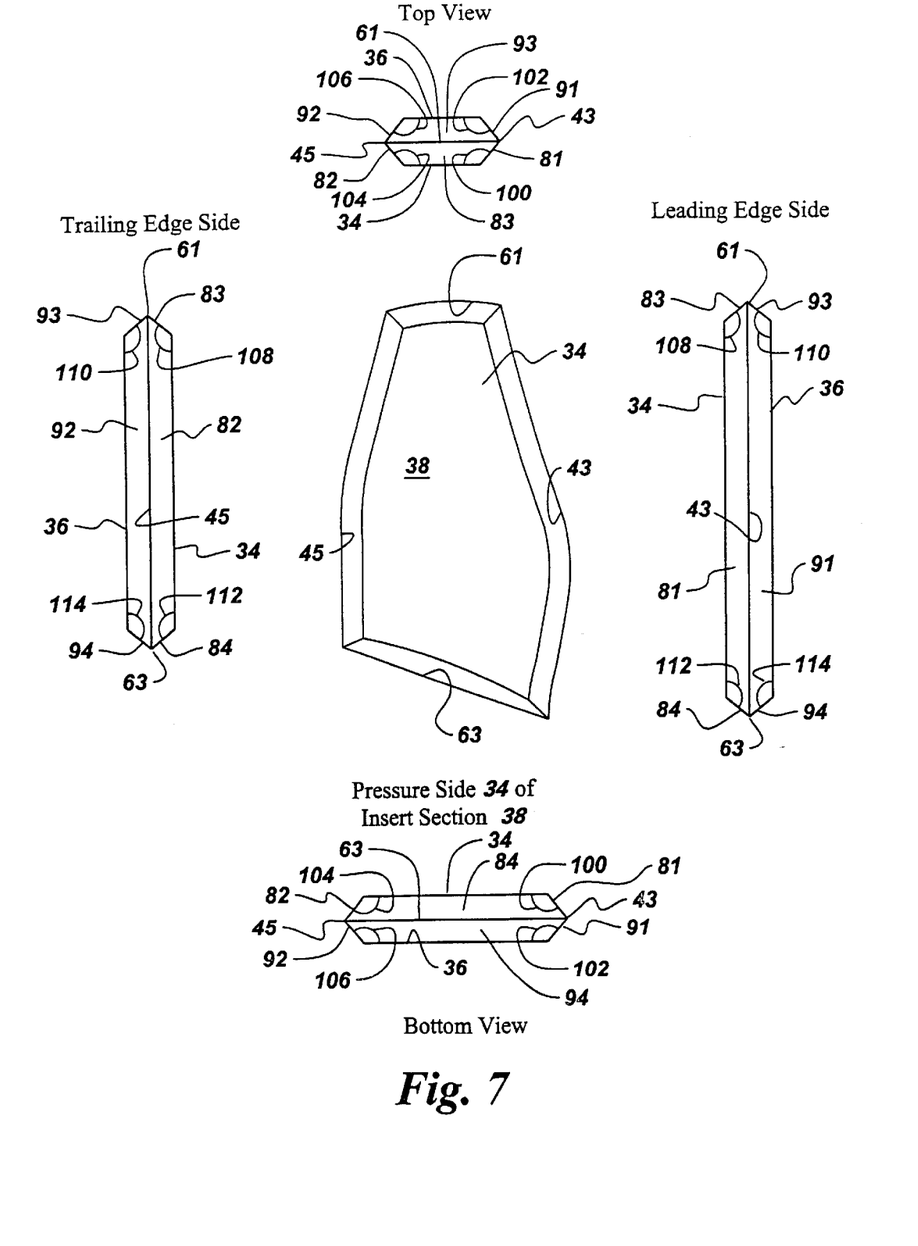
FIG. 7 provides a schematic pressure side front view, a schematic leading edge side view, a schematic trailing edge side view, a schematic top view and a schematic bottom view of the insert section in one embodiment of the present invention.

In one embodiment of the present invention a single insert section 38 interfaces with the composite section 28 as shown in FIGS. 1 and 6. In a more specific embodiment, as shown in FIG. 7, a pressure side tapered leading edge 81 is disposed between the pressure side 34 of the insert section 38 and the insert leading edge 43 so as to form a first pressure side interior angle 100, wherein the first pressure side interior angle 100 is typically in a range from about 20 degrees to about 179 degrees. The first pressure side interior angle 100 is measured between the pressure side tapered leading edge 81 and the pressure side 34 of the insert section 38. A suction side tapered leading edge 91 is disposed between the suction side 36 of the insert section 38 and the insert leading edge 43 so as to form a first suction side interior angle 102, wherein the first suction side interior angle 102 is typically in a range from about 20 degrees to about 179 degrees. The first suction side interior angle 102 is measured between the suction side tapered leading edge 91 and the suction side 36 of the insert section 38. A pressure side tapered trailing edge 82 is disposed between the pressure side 34 of the insert section 38 and the insert trailing edge 45 so as to form a second pressure side interior angle 104, wherein the first pressure side interior angle 104 is typically in a range from about 20 degrees to about 179 degrees. The second pressure side interior angle 104 is measured between the pressure side tapered trailing edge 82 and the pressure side 34 of the insert section 38. A suction side tapered trailing edge. 92 is disposed between the suction side 36 of the insert section 38 and the insert trailing edge 45 so as to form a second suction side interior angle 106, wherein the second suction side interior angle 106 is typically in a range from about 20 degrees to about 179 degrees. The second suction side interior angle 106 is measured between the suction side tapered trailing edge 92 and the suction side 36 of the insert section 38. A pressure side tapered blade tip edge 83 is disposed between the pressure side 34 of the insert section 38 and the insert blade tip edge 61 so as to form a third pressure side interior angle 108; wherein the third pressure side interior angle 108 is typically in a range from about 20 degrees to about 179 degrees. The third pressure side interior angle 108 is measured between the pressure side tapered blade tip edge 83 and the pressure side 34 of the insert section 38. A suction side tapered blade tip edge 93 is disposed between the suction side 36 of the insert section 38 and the insert blade tip edges 61 so as to form a third suction side interior angle 110; wherein the third suction side interior angle 110 is typically in a range from about 20 degrees to about 179 degrees. The third suction side interior angle 110 is measured between the suction side tapered blade tip edge 93 and the suction side 36 of the insert section 38. A pressure side tapered blade root edge 84 is disposed between the pressure side 34 of the insert section 38 and the insert blade root edge 63 so as to form a fourth pressure side interior angle 112, wherein the fourth pressure side interior angle 112 is typically in a range from about 20 degrees to about 179 degrees. The fourth pressure side interior angle 112 is measured between the pressure side tapered blade root edge 84 and the pressure side 34 of the insert section 38. A suction side tapered blade root edge 94 is disposed between the suction side 36 of the insert section 38 and the insert blade root edge 63 so as to form a fourth suction side interior angle 114; wherein the fourth suction side interior angle 114 is typically in a range from about 20 degrees to about 179 degrees. The fourth suction side interior angle 114 is measured between the suction side tapered blade root edge 94 and the suction side 36 of the insert section 38.

In related embodiments of the present invention, at least two insert sections (shown in FIGS. 4 and 5 as first insert section 138, second insert section 238 and third insert section 338) and interface with the composite section 28, and the insert sections 138, 238 and 338 comprise the same internal angle configuration described for the insert section 38 above and as depicted in FIG. 7.

In some embodiments of the present invention, the airfoil portion 14 of FIGS. 2 and 6 includes an erosion coating 52 as shown in FIGS. 1–3, 5–6 and 8–9. In one embodiment of the present invention, the erosion coating 52 of FIG. 2 is disposed on at least a portion of the pressure side 34 and the erosion coating 52 is disposed on at least a portion of the suction side 36. In another embodiment of the present invention, the erosion coating 52 of FIG. 2 is disposed on and bonded to at least a portion of the pressure side 34 and the erosion coating 52 is disposed on and bonded to at least a portion of the suction side 36. In one embodiment, polyurethane was selected as the material for the erosion coating 52 of FIG. 6 as the polyurethane provides greater erosion resistance than the composite section 28.

In another embodiment of the present invention, a protective leading edge coating 70 is disposed on the leading edge 30, at least a portion of the pressure side 34, and at least a portion of the suction side 36. In an exemplary embodiment, titanium was selected as a material for the protective leading edge coating 70, as titanium provides greater erosion resistance than the composite section 28. When titanium is used as the protective leading edge coating 70, the titanium provides a high strength to weight ratio. When utilizing titanium as the protective leading edge coating 70, the titanium also provides increased ruggedness compared to the composite section 28 with respect to foreign object ingestion or bird strike events that are likely to be experienced in aircraft engine fan blades. In another embodiment of the present invention, a protective trailing edge coating 72 is disposed on the trailing edge 32, at least a portion of the pressure side 34, and at least a portion of the suction side 36. In an exemplary embodiment of the present invention, a protective blade tip edge coating 53 of FIG. 5 is disposed on the blade tip edge 18 of FIG. 2, at least a portion of the pressure side 34, and at least a portion of the suction side 36 (not shown in FIG. 5). In another embodiment of the present invention, titanium was used as the material for the protective blade tip coating 53 of FIG. 5. In another embodiment of the present invention, both the protective leading edge coating 70 of FIG. 2 and the protective trailing edge coating 72 are disposed as described above. In an exemplary embodiment of the present invention titanium was used as the material for the protective trailing edge coating 72 of FIG. 6. In another embodiment of the present invention, the protective leading edge coating 70, the protective trailing edge coating 72 and the protective blade tip edge coating 53 of FIG. 5 are disposed as described above. In another embodiment of the present invention, the erosion coating 52 of FIG. 2 is disposed on and bonded to at least a portion of the pressure side 34 that is not covered by the protective leading edge coating 70, protective trailing edge coating 72 and the protective blade tip edge coating 53 and a portion of the suction side 36, that is not covered by the protective leading edge coating 70, protective trailing edge coating 72 and the protective blade tip edge coating 53, while the protective leading edge coating 70, the protective trailing edge coating 72 and the protective blade tip edge coating 53 of FIG. 5 are disposed as described above.

In another embodiment of the present invention, the erosion coating 52 of FIG. 3 is disposed on and bonded to at least a portion of the pressure side 34 and at least a portion of the suction side 36, and the protective leading edge coating 70 is disposed on at least a portion of the erosion coating 52 along the leading edge 30. In another embodiment of the present invention, the erosion coating 52 is disposed on and bonded to at least a portion of the pressure side 34 and at least a portion of the suction side 36, and the protective trailing edge coating 72 is disposed on at least a portion of the erosion coating 52 along the trailing edge 32. In another embodiment of the present invention, the erosion coating 52 is disposed on and bonded to at least a portion of the pressure side 34 and at least a portion of the suction side 36, and the protective blade tip edge coating 53 of FIG. 5 is disposed on at least a portion of the erosion coating 52 of FIG. 3 along the blade tip edge 18. In another embodiment of the present invention, the erosion coating 52 is disposed on and bonded to at least a portion of the pressure side 34 and at least a portion of the suction side 36, the protective leading edge coating 70 is disposed on at least a portion of the erosion coating 52 along the leading edge 30, and the protective trailing edge coating 72 is disposed on at least a portion of the erosion coating 52 along the trailing edge 32. In another embodiment of the present invention, the erosion coating 52 is disposed on and bonded to at least a portion of the pressure side 34 and at least a portion of the suction side 36, the protective leading edge coating 70 is disposed on at least a portion of the erosion coating 52 along the leading edge 30, the protective trailing edge coating 72 is disposed on at least a portion of the erosion coating 52 along the trailing edge 32, and the protective blade tip edge coating 53 of FIG. 5 is disposed on at least a portion of the erosion coating 52 of FIG. 3 along the blade tip edge 18.

Figure 8:
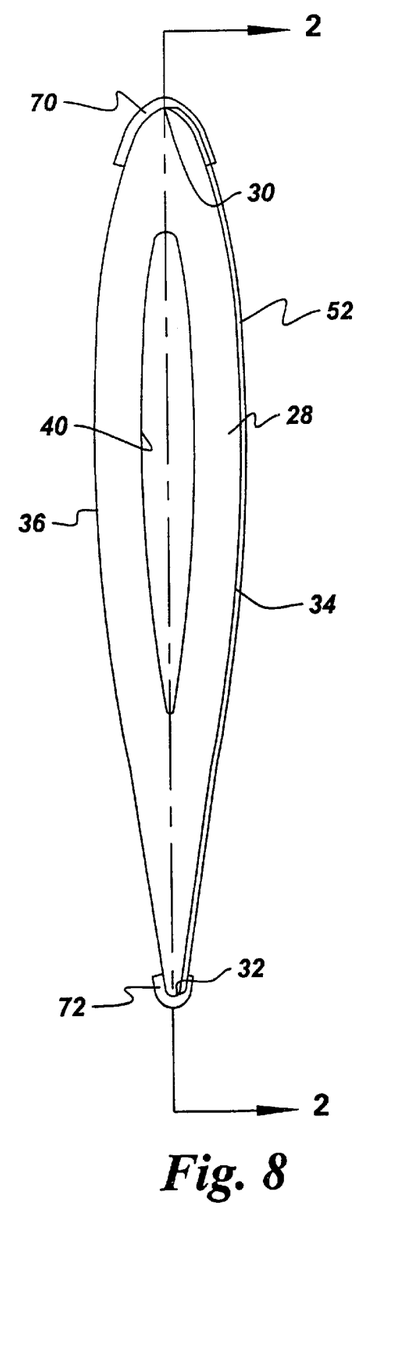
FIG. 8 is a schematic cross-sectional view of the airfoil portion of an embodiment of the hybrid turbine blade of FIG. 1, taken along lines 2—2 of FIG. 1.

In another embodiment of the present invention, the erosion coating 52 of FIG. 8 is disposed on and bonded to at least a portion of the pressure side 34. In another embodiment of the present invention, the erosion coating 52 is disposed on and bonded to at least a portion of the pressure side 34, and the protective leading edge coating 70 is disposed on at least a portion of the erosion coating 52 and at least a portion of the suction side 36 along the leading edge 30. In another embodiment of the present invention, the erosion coating 52 is disposed on and bonded to at least a portion of the pressure side 34, and the protective trailing edge coating 72 is disposed on at least a portion of the erosion coating 52 and on at least a portion of the suction side 36 along the trailing edge 32. In another embodiment of the present invention, the erosion coating 52 is disposed on and bonded to at least a portion of the pressure side 34, and the protective blade tip edge coating 53 of FIG. 5 is disposed on at least a portion of the erosion coating 52 of FIG. 8 and at least a portion of the suction side 36 along the blade tip edge 52. In another embodiment of the present invention, the erosion coating 52 is disposed on and bonded to at least a portion of the pressure side 34, the protective leading edge coating 70 is disposed on at least a portion of the erosion coating 52 and at least a portion of the suction side 36 along the leading edge 30, and the protective trailing edge coating 72 is disposed on at least a portion of the erosion coating 52 and on at least a portion of the suction side 36 that is not covered by the protective leading edge coating 70 along the trailing edge 32. In another embodiment of the present invention, the erosion coating 52 is disposed on and bonded to at least a portion of the pressure side 34, the protective leading edge coating 70 is disposed on at least a portion of the erosion coating 52 and at least a portion of the suction side 36 along the leading edge 30, and the protective trailing edge coating 72 is disposed on at least a portion of the erosion coating 52 that is not covered by the protective leading edge coating 70 and on at least a portion of the suction side 36 along the trailing edge 32 that is not covered by the protective leading edge coating 70, and the protective blade tip edge coating 53 of FIG. 5 is disposed on at least a portion of the erosion coating 52 of FIG. 8 that is not covered by the protective leading edge coating 70 and protective leading edge coating 72 and at least a portion of the suction side 36 along the blade tip edge 52 that is not covered by the protective leading edge coating 70 and protective leading edge coating 72.

Figure 9:
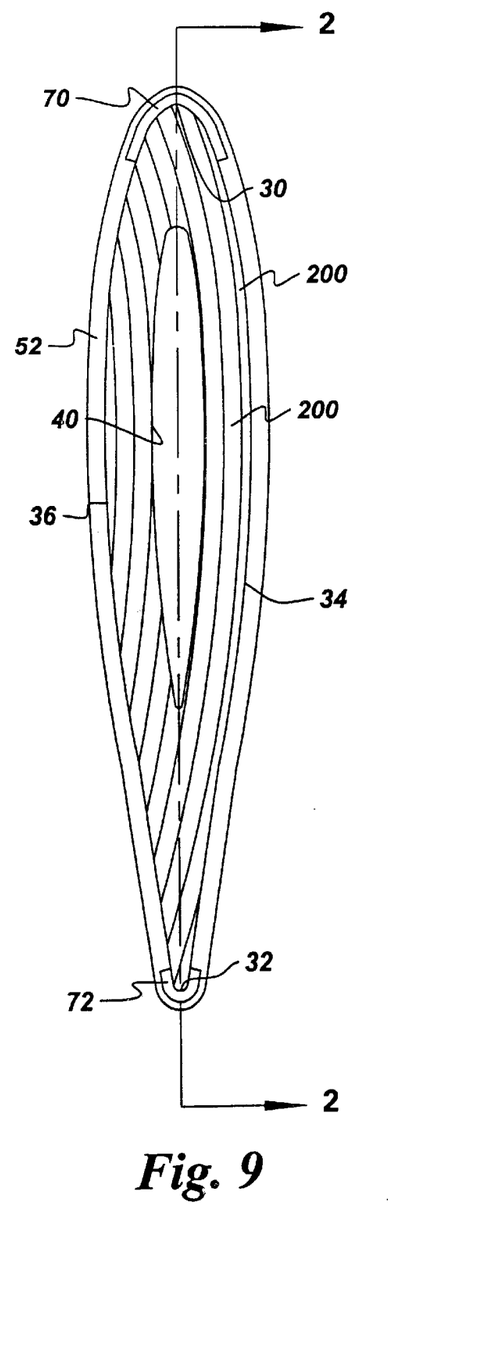
FIG. 9 is a schematic cross-sectional view of the airfoil portion of an embodiment of the hybrid turbine blade of FIG. 1, taken along lines 2—2 of FIG. 1.

In another embodiment of the present invention, the protective leading edge coating 70 of FIG. 9 is disposed on a portion of the pressure side 34 and a portion of the suction side 36 as described above. The erosion coating 52 is disposed over a portion of the pressure side 34 that is not covered by the protective leading edge coating 70 and the erosion coating 52 is disposed over a portion of the suction side 36 that is not covered by the protective leading edge coating 70. In another embodiment of the present invention, the protective leading edge coating 70 and the protective trailing edge coating 72 are disposed on a portion of the pressure side 34 and a portion of the suction side 36 as described above. The erosion coating 52 is disposed over a portion of the pressure side 34 that is not covered by the protective leading edge coating 70 and the protective trailing edge coating 72 and the erosion coating 52 is disposed over a portion of the suction side 36 that is not covered by the protective leading edge coating 70 and the protective trailing edge coating 72. In another embodiment of the present invention, the protective leading edge coating 70, the protective trailing edge coating 72 and the protective blade tip edge coating 53 of FIG. 5 are disposed on a portion of the pressure side 34 of FIG. 9 and a portion of the suction side 36 as described above. The erosion coating 52 is disposed over a portion of the pressure side 34 that is not covered by the protective leading edge coating 70, the protective trailing edge coating 72 and the protective blade tip edge coating 53 of FIG. 5 and the erosion coating 52 of FIG. 9 is disposed over a portion of the suction side 36 that is not covered by the protective leading edge coating 70, the protective trailing edge coating 72, and the protective blade tip edge coating 53 of FIG. 5.

The shank portion 12 is typically a composite shank portion suitably bonded or otherwise affixed to the airfoil portion. However, a metal shank portion (suitably bonded or otherwise affixed to the composite airfoil portion) may be employed in particular blade designs. The dovetail 22 of the shank portion 12 can be partially composite (not shown) on the pressure (concave) side. Alternatively, the dovetail 22 can have a metal wedge system (also not shown) to positively capture adjoining the insert section and provide a metallic dovetail wear surface.

In a gas turbine application of the present invention, the bird impact footprint is primarily over the area of the pressure side 34 along the leading edge 30 of the hybrid turbine blade 10. In one embodiment of the present invention, the affected areas of the composite section 28, the insert section 38, and the protective leading edge coating 70 provide buckling and fracture resistance. In one embodiment of the present invention, the reduced mass of the hybrid turbine blade 10, compared to a similarly configured non-hybrid turbine blade, has the general effect of reducing the broken blade impact force on the containment structure and trailing blades (not shown) for a given blade rotational speed.

In another gas turbine application of the present invention, the insert section 38 is mechanically or thermally removable from the composite section 28 at a temperature below the melting point of the composite material. This allows the airfoil portion 14 to be easily repairable should it become damaged due to bird strikes or foreign object impacts. If the airfoil portion is damaged in the composite section 28 and the insert section 38, the damaged insert section 38 would be thermally removed, the composite section 28 repaired, and a new insert section 38 and composite material reapplied. Since most of such blade damage is to the lead row of hybrid turbine blades 10, typically the airfoil portion 14 is an airfoil portion of a hybrid turbine blade 10 in a gas turbine aircraft engine (or gas turbine aircraft engine compressor if the gas turbine engine has no fan).

The insert section 38 functions to facilitate lay-up and autoclave curing or other manufacturing methods of the hybrid turbine blade 10. In one embodiment, the insert section 38 is wrapped by a (meaning at least one) composite material layer 200. The composite material layer 200 of FIG. 9 wrapped around the insert section 38 provides additional stability to the insert section 38 of FIG. 6 during fabrication. Wrapping the composite material layer 200 of FIG. 9 around the insert section 38 of FIG. 6 typically lowers the initiation of cracks within the insert section 38. The composite material layer 200 of FIG. 9 wrapped around the insert section 38 of FIG. 6 allows more efficient load transfer around the recess 40 in the final application. In an alternative embodiment, a layer of adhesive coats the insert section 38. The layer of adhesive may also be used to improve the bond between the composite section 28 and the insert section 38 by improving adhesion between the insert section 38 and the composite section 28. The hybrid turbine blade 10 in its fully assembled condition has the insert section 38 disposed in the recess 40 of the composite section 28, so that the surrounding composite material layers 200 of FIG. 9 in the composite section 28 of FIG. 6 are capable of meeting all mechanical requirements, whereby no load transfer needs to occur through the insert section 38. When an elastomeric material is utilized to construct the insert section 38, the high compliance and elongation capabilities of the elastomer material allow the composite section 28 to deform with little resistance from the insert section 38 even in a severe impact loading, such as might occur when a gas turbine engine ingests a foreign object.

A typical method for making the hybrid turbine blade 10 of the invention includes, but is not limited to, fabricating the composite section 28 and the insert section 38 separately or as one unit (co-cured) using autoclave and compression mold techniques. In one fabrication method of the present invention the insert section 38 is prefabricated. The plurality of composite material layers 200 of FIG. 9 are laid up a to generate a portion of the composite section 28 of FIG. 6, where the portion of the composite section 28 comprises the recess 40. The insert section 28 is disposed in the recess 40; and additional composite material layers 200 are laid up, so that the additional composite material layers 200 cover the insert section 38 and the final desired thickness of the composite section 28 is reached and a completed version of the composite section 28 is produced. The completed version of the composite section 28 is then subjected to a process that consolidates and bonds the composite material layers 200 together and the process also bonds the insert section 38 to the adjacent composite material layers 200. The consolidation and bonding process is typically performed by an autoclave technique, alternatively the compression mold technique, and alternatively the resin mold technique. The autoclave technique, compression mold technique, and resin mold technique are only provided as examples of the consolidation and bonding process and do not imply a restriction to the present invention.

In other embodiments of the present invention, multiple insert sections (shown as 138 and 238 in FIG. 4 and 138, 238 and 338 also in FIG. 4 for example) are disposed in respective recesses. When multiple insert sections are used in the fabrication process, a rib 46 is typically formed in-between recesses.

In one embodiment of the present invention, the plurality of composite material layers 200 of FIG. 9 are laid up a to generate a portion of the composite section 28 of FIG. 1, where the portion of the composite section 28 comprises the recess 40. The insert section 38 is disposed in the recess 40; and additional composite material layers 200 are laid up, so that the additional composite material layers 200 cover the insert section 38 and the final desired thickness of the composite section 28 is reached.

In one embodiment of the present invention, the composite segment 28 is typically built up by manual or machine layering or by braiding around the composite section 28 and the insert section 38. As previously mentioned, in the case of composite materials, fiber-filament modulus and orientation would be chosen to maintain overall airfoil-portion stiffness to reduce structural bending of the blade under centrifugal and aerodynamic load, as is within the level of skill of the artisan.

The foregoing description of several embodiments of the present invention has been presented for purposes of illustration. Although the invention has been described and illustrated in detail, it is to be clearly understood that the same is intended by way of illustration and example only and is not to be taken by way of limitation. Obviously many modifications and variations of the present invention are possible in light of the above teaching. Accordingly, the spirit and scope of the present invention are to be limited only by the terms of the appended claims.

What is claimed is:

1. A multi-component hybrid turbine blade comprising:
    an airfoil portion comprising a composite section having a first density and a recess, said airfoil portion further comprising an insert section having a second mass density, which is less than said first mass density;
    wherein said insert section is disposed in said recess and bonded to said composite section;
    wherein said composite section and said insert section together define an airfoil shape, wherein said composite section comprises a plurality of composite material layers comprising fiber filaments embedded in a matrix binder, and wherein said matrix binder comprises a toughening material.

2. The hybrid turbine blade of claim 1, further comprising a shank portion, wherein said insert section has sufficient stiffness and dimensional stability to maintain said airfoil shape, and wherein said insert section has sufficient compliance and flexibility to conform to said recess.

3. The hybrid turbine blade of claim 1, wherein said fiber filaments are selected from the group consisting of graphite fibers, glass fibers, aramid fibers, carbon fibers, and boron fibers and combinations thereof.

4. The hybrid turbine blade of claim 1, wherein said matrix binder is selected from the group consisting of epoxy resin, bisaleimide, polyimide, polyetherimide, polyetheretherketone, poly(aryl sulfone), polyethersulfone and cyante ester and combinations thereof.

5. The hybrid turbine blade of claim 1, wherein said toughening material comprises a plurality of rubber particles.

6. The hybrid turbine blade of claim 1, wherein said insert section comprises an insert section material, said insert section comprising a hollow portion formed in said insert section material.

7. The hybrid turbine blade of claim 1, wherein said insert section comprises an insert section material selected from the group consisting of thermoplastic materials, thermoset materials, metals, honeycomb ceramics, silicones and combinations thereof, and wherein said insert section comprises a hollow portion defined by said insert section material.

8. A hybrid turbine blade comprising:
    an airfoil portion comprising a composite section having a first density and a recess, said airfoil portion further comprising an insert section having a second mass density, which is less than said first mass density, wherein said insert section is disposed in said recess and bonded to said composite section, and wherein said composite section and said insert section together define an airfoil shape; and
    a protective leading edge coating disposed on a portion of a pressure side and a portion of a suction side of said composite section along a leading edge of said airfoil portion.

9. The hybrid turbine blade of claim 8, further comprising an erosion coating disposed on and bonded to a portion of said pressure side not covered by said protective leading edge coating and a portion of said suction side not covered by said protective leading edge coating.

10. A hybrid turbine blade comprising:
    an airfoil portion comprising a composite section having a first density and a recess, said airfoil portion further comprising an insert section having a second mass density, which is less than said first mass density, wherein said insert section is disposed in said recess and bonded to said composite section, and wherein said composite section and said insert section together define an airfoil shape; and
    a protective trailing edge coating disposed on a portion of a pressure side and a portion of a suction side of said composite section along a trailing edge of said airfoil portion.

11. The hybrid turbine blade of claim 10, wherein an erosion coating is disposed on and bonded to a portion of said pressure side not covered by said protective trailing edge coating and a portion of said suction side not covered by said protective trailing edge coating.

12. A hybrid turbine blade comprising:

an airfoil portion comprising a composite section having a first density and a recess, said airfoil portion further comprising an insert section having a second mass density, which is less than said first mass density, wherein said insert section is disposed in said recess and bonded to said composite section, and wherein said composite section and said insert section together define an airfoil shape; and a protective blade tip edge coating disposed on a portion of a pressure side and a portion of a suction side of said composite section along a blade tip edge of said airfoil portion.

13. The hybrid turbine blade of claim 12, further comprising an erosion coating disposed on and bonded to a portion of said pressure side not covered by said protective blade tip edge coating and a portion of said suction side not covered by said protective blade tip edge coating.

14. A hybrid turbine blade comprising:

a shank portion;

an airfoil portion comprising a composite section having a first density and a recess, said airfoil portion further comprising an insert section having a second mass density, which is less than said first mass density, wherein said insert section is disposed in said recess and bonded to said composite section, and wherein said composite section and said insert section together define an airfoil shape;

an erosion coating disposed on and bonded to at least a portion of a pressure side and at least a portion of a suction side of said composite section; and a protective leading edge coating disposed on a portion of said erosion coating along a leading edge of said airfoil portion.

15. The hybrid turbine blade of claim 14 further comprising:

a protective trailing edge coating disposed on a portion of said erosion coating along a trailing edge of said airfoil portion.

16. The hybrid turbine blade of claim 14 further comprising:

a protective blade tip edge coating disposed on a portion of said erosion coating along a blade tip edge of said airfoil portion.

17. A hybrid turbine blade comprising:

an airfoil portion comprising a composite section having a first density and a recess, said airfoil portion further comprising an insert section having a second mass density, which is less than said first mass density, wherein said insert section is disposed in said recess and bonded to said composite section, and wherein said composite section and said insert section together define an airfoil shape;

an erosion coating disposed on and bonded to at least a portion of a pressure side of said composite section; and a protective leading edge coating disposed on a portion of said erosion coating along a leading edge of said airfoil portion and a portion of a suction side of said composite section.

18. The hybrid turbine blade of claim 17 further comprising:

a shank portion; and a protective trailing edge coating disposed on a portion of said erosion coating along a trailing edge of said airfoil portion and at least a portion of a suction side of said composite section.

19. The hybrid turbine blade of claim 17 further comprising:

a shank portion; and a protective blade tip edge coating disposed on a portion of said erosion coating along a blade tip edge of said airfoil portion and at least a portion of a suction side of said composite section.

20. The hybrid turbine blade of claim 17 further comprising:

a protective trailing edge coating disposed on a portion of said erosion coating along a trailing edge of said airfoil portion that is not covered by said protective leading edge coating and at least a portion of a suction side of said composite section that is not covered by said protective leading edge coating; and a protective blade tip edge coating disposed on a portion of said erosion coating along a blade tip edge of said airfoil portion that is not covered by said protective leading edge coating and said protective trailing edge coating and at least a portion of a suction side of said composite section that is not covered by said protective leading edge coating and said protective trailing edge coating.

21. The hybrid turbine blade of claim 17 further comprising:

a protective trailing edge coating disposed on a portion of said erosion coating along a trailing edge of said airfoil portion that is not covered by said protective leading edge coating and at least a portion of a suction side of said composite section that is not covered by said protective leading edge coating.

22. A hybrid turbine blade comprising:

an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape, and wherein said insert section comprises a first insert section and a second insert section separated by a rib.

23. The hybrid turbine blade of claim 22, wherein said airfoil portion has a pressure side and a suction side, wherein said recess comprises a first recess and a second recess, wherein said first insert section is disposed on said first recess, and wherein said second insert section is disposed on said second recess.

24. The hybrid turbine blade of claim 23, wherein said rib is disposed between, and bonded to, said first insert section and said second insert section, and wherein said rib extends between a first interior trailing edge of said first recess and a second interior leading edge of said second recess.

25. The hybrid turbine blade of claim 22, wherein said first insert section comprises a first hollow portion and said second insert section comprises a second insert hollow portion.

26. A hybrid turbine blade comprising:

a shank portion; and an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape, wherein said insert section further comprises:

a pressure side tapered leading edge disposed between a pressure side of said insert section and an insert leading edge so as to form a first pressure side interior angle, wherein said first pressure side interior angle is typically in a range from about 20 degrees to about 179 degrees, wherein said first pressure side interior angle is measured between said pressure side tapered leading edge and said pressure side of said insert section;

a suction side tapered leading edge disposed between a suction side of said insert section and said insert leading edge so as to form a first suction side interior angle, wherein said first suction side interior angle is typically in a range from about 20 degrees to about 179 degrees, wherein said first suction side interior angle is measured between said suction side tapered leading edge and said suction side of said insert section;

a pressure side tapered trailing edge disposed between said pressure side of said insert section and said insert trailing edge so as to form a second pressure side interior angle, wherein said second pressure side interior angle is typically in a range from about 20 degrees to about 179 degrees, wherein said second pressure side interior angle is measured between said pressure side tapered trailing edge and said pressure side of said insert section;

a suction side tapered trailing edge disposed between said suction side of said insert section and said insert trailing edge so as to form a second suction side interior angle, wherein said second suction side interior angle is typically in a range from about 20 degrees to about 179 degrees, wherein said second suction side interior angle is measured between said suction side tapered trailing edge and said suction side of said insert section;

a pressure side tapered blade tip edge disposed between said pressure side of said insert section and said insert blade tip edge so as to form a third pressure side interior angle, wherein said third pressure side interior angle is typically in a range from about 20 degrees to about 179 degrees, wherein said third pressure side interior angle is measured between said pressure side tapered blade tip edge and said pressure side of said insert section;

a suction side tapered blade tip edge disposed between said suction side of said insert section and said insert blade tip edge so as to form a third suction side interior angle, wherein said third suction side interior angle is typically in a range from about 20 degrees to about 179 degrees, wherein said third suction side interior angle is measured between said suction side tapered blade tip edge and said suction side of said insert section; and a pressure side tapered blade root edge disposed between said pressure side of said insert section and said insert blade root edge so as to form a fourth pressure side interior angle, wherein said fourth pressure side interior angle is typically in a range from about 20 degrees to about 179 degrees, wherein said fourth pressure side interior angle is measured between said pressure side tapered blade root edge and said pressure side of said insert section;

and a suction side tapered blade root edge disposed between said suction side of said insert section and said insert leading edge so as to form a fourth suction side interior angle, wherein said fourth suction side interior angle is typically in a range from about 20 degrees to about 179 degrees, wherein said fourth suction side interior angle is measured between said suction side tapered blade root edge and said suction side of said insert section.

27. A hybrid turbine blade comprising:
an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape,
wherein said first mass density has a range from about 1.4 grams per cubic centimeter to about 2.0 grams per cubic centimeter.

28. A hybrid turbine blade comprising:
an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape,
wherein said second mass density has a range from about 0.01 grams per cubic centimeter to about 0.9 grams per cubic centimeter.

29. A hybrid turbine blade comprising:
an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape,
wherein said composite section has a first volume and said insert section has a second volume, and wherein said second volume has a value corresponding to at least about ten percent of said first volume.

30. A hybrid turbine blade comprising:
an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape,
wherein said insert section comprises an elastomer material further comprising filler particles.

31. The hybrid turbine blade of claim 30, wherein each of said filler particles comprises a plurality of air containing cavities.

32. The hybrid turbine blade of claim 31, wherein each of said air containing cavities has a volume of about $10^{-16}$ cubic millimeters.

33. The hybrid turbine blade (10) of claim 30, wherein said elastomer material has an elastic modulus range from about 3500 kPa to about 350000 kPa.

34. A hybrid turbine blade comprising:

an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape, wherein said insert section comprises a hollow portion and internal ribs.

35. A hybrid turbine blade comprising:

an airfoil portion comprising a composite section having a first density and a recess, said airfoil portion further comprising an insert section having a second mass density, which is less than said first mass density, wherein said insert section is disposed in said recess and bonded to said composite section, wherein said composite section and said insert section together define an airfoil shape, wherein said insert section comprises a hollow portion and is adapted to be filled and pressurized by a fluid.

36. A multi-component hybrid turbine blade comprising:

a shank portion;

an airfoil portion comprising a composite section having a first mass density and a recess, and an insert section having a second mass density which is less than said first mass density; and a protective leading edge coating disposed on a portion of a pressure side and a portion of a suction side of said composite section along a leading edge of said airfoil portion, wherein said insert section is disposed in said recess and bonded to said composite section;

wherein said composite section and said insert section together define an airfoil shape, wherein said insert section has sufficient stiffness and dimensional stability to maintain said airfoil shape, and wherein said insert section has sufficient compliance and flexibility to conform to said recess, and wherein said composite section is comprised of a plurality of composite material layers comprising fiber filaments embedded in a matrix binder.

37. The hybrid turbine blade of claim 36, wherein said fiber filaments are selected from the group consisting of graphite fibers, glass fibers, aramid fibers, carbon fibers, and boron fibers and combinations thereof.

38. The hybrid turbine blade of claim 36, wherein said matrix binder is selected from the group consisting of epoxy resin, bisaleimide, polyimide, polyetherimide, polyetheretherketone, poly(aryl sulfone), polyethersulfone and cyante ester and combinations thereof.

39. The hybrid turbine blade of claim 36 further comprising an erosion coating disposed on and bonded to at least a portion of the pressure side and at least a portion of the suction side of said composite section.

40. The hybrid turbine blade of claim 36 further comprising an erosion coating disposed on and bonded to a portion of said pressure side not covered by said protective leading edge coating and a portion of said suction side not covered by said protective leading edge coating.

41. The hybrid turbine blade of claim 36 further comprising a protective trailing edge coating disposed on a portion of a the pressure side and a portion of the suction side of said composite section along a trailing edge of said airfoil portion.

42. The hybrid turbine blade of claim 41, wherein an erosion coating is disposed on and bonded to a portion of said pressure side not covered by said protective trailing edge coating and a portion of said suction side not covered by said protective trailing edge coating.

43. The hybrid turbine blade of claim 36 further comprising a protective blade tip edge coating disposed on a portion of the pressure side and a portion of a the suction side of said composite section along a blade tip edge of said airfoil portion.

44. The hybrid turbine blade of claim 43, further comprising an erosion coating is disposed on and bonded to a portion of said pressure side not covered by said protective blade tip edge coating and a portion of said suction side not covered by said protective blade tip edge coating.

45. The hybrid turbine blade of claim 36 further comprising an erosion coating disposed on and bonded to a pressure side of said composite section.

46. The hybrid turbine blade of claim 36, wherein said insert section comprises a first insert section and a second insert section separated by a rib.

47. The hybrid turbine blade of claim 36, wherein said insert section comprises a hollow portion.

48. The hybrid turbine blade of claim 36, wherein said first mass density has a range from about 1.4 grams per cubic centimeter to about 2.0 grams per cubic centimeter.

49. The hybrid turbine blade of claim 36, wherein said second mass density has a range from about 0.01 grams per cubic centimeter to about 0.9 grams per cubic centimeter.

50. The hybrid turbine blade of claim 36, wherein said insert section comprises a hollow portion, and an insert section material, said insert material being selected from the group consisting of thermoplastic materials, thermoset materials, metals, honeycomb ceramics, silicones and combinations thereof.

* * * * *